United States Patent
Xu et al.

(10) Patent No.: US 12,176,477 B2
(45) Date of Patent: Dec. 24, 2024

(54) CHARGING AND DISCHARGING METHOD FOR HIGH-CAPACITY RETENTION RATE LITHIUM ION BATTERY

(71) Applicant: ZHEJIANG FUNLITHIUM NEW ENERGY TECH CO., LTD., Zhejiang (CN)

(72) Inventors: Xiaoxiong Xu, Zhejiang (CN); Yanming Cui, Zhejiang (CN); Yuanqiao Huang, Zhejiang (CN)

(73) Assignee: ZHEJIANG FUNLITHIUM NEW ENERGY TECH CO., LTD., Zhejiang (CN)

( * ) Notice: Subject to any disclaimer, the term of this patent is extended or adjusted under 35 U.S.C. 154(b) by 681 days.

(21) Appl. No.: 17/439,957

(22) PCT Filed: Jun. 22, 2019

(86) PCT No.: PCT/CN2019/092436
§ 371 (c)(1),
(2) Date: Sep. 16, 2021

(87) PCT Pub. No.: WO2020/215473
PCT Pub. Date: Oct. 29, 2020

(65) Prior Publication Data
US 2022/0231324 A1   Jul. 21, 2022

(30) Foreign Application Priority Data
Apr. 25, 2019   (CN) .......................... 201910338146.X

(51) Int. Cl.
*H01M 10/0525*  (2010.01)
*H01M 10/04*    (2006.01)
*H01M 10/44*    (2006.01)
*H01M 50/531*   (2021.01)
*H02J 7/00*     (2006.01)

(52) U.S. Cl.
CPC ... *H01M 10/0525* (2013.01); *H01M 10/0445* (2013.01); *H01M 10/44* (2013.01); *H01M 10/446* (2013.01); *H02J 7/0069* (2020.01); *H02J 7/007182* (2020.01); *H01M 50/531* (2021.01)

(58) Field of Classification Search
None
See application file for complete search history.

(56) References Cited

U.S. PATENT DOCUMENTS

2014/0176076 A1*  6/2014  Momo ............. H01M 10/0583
                                                      320/128
2018/0301289 A1* 10/2018  Wu ........................ H01G 11/46

FOREIGN PATENT DOCUMENTS

| CN | 103390764 A | * | 11/2013 |
| CN | 103560280 A | * |  2/2014 |
| JP | 2007305475  | * | 11/2007 |

* cited by examiner

*Primary Examiner* — Jonathan Crepeau
(74) *Attorney, Agent, or Firm* — Chun-Ming Shih; LANWAY IPR SERVICES

(57) ABSTRACT

The present invention relates to charging and discharging methods of a lithium ion battery with a high capacity retention rate, which comprise the following steps: (1) when a number of turns is n, the negative and positive electrodes of the lithium ion battery are only charged; after the charging is finished, a third electrode and a fourth electrode are discharged with controlled current, wherein the controlled current is 0.05-10 A; (2) after standing for 1 hour, the fourth electrode is connected in parallel with the negative electrode of the lithium ion battery to perform the discharge with the positive electrode of the lithium ion battery; (3) common charge and discharge between the positive and negative electrodes of the lithium ion battery occur at the (n+1)th and subsequent turns; (4) the common charge and discharge are continued until the next conditional number of turns, and steps (1)-(4) are repeated; and (5) when the number of cycles reaches the specified number of turns, the charging and discharging methods are finished; n is the conditional number of turns, which is selected from the next turn every time the discharge capacity is attenuated by 0.2-1%. The charging and discharging methods can release active lithium according to the self-demand of each battery cell or battery pack, so as to facilitate the capacity retention rate.

6 Claims, No Drawings

CHARGING AND DISCHARGING METHOD FOR HIGH-CAPACITY RETENTION RATE LITHIUM ION BATTERY

TECHNICAL FIELD

The present invention relates to the technical field of lithium ion batteries, in particular to charging and discharging methods of a lithium ion battery with a high capacity retention rate.

BACKGROUND ART

Lithium ion battery is a kind of rechargeable battery, which is composed of a positive electrode, a negative electrode, a separator and an electrolyte. The positive and negative electrodes are immersed in the electrolyte; lithium ions move back and forth between the positive electrode and the negative electrode using the electrolyte as a medium. During the charging and discharging process, $Li^+$ is intercalated and deintercalated back and forth between these two electrodes. When charging, $Li^+$ is deintercalated from the positive electrode and intercalated into the negative electrode via the electrolyte, such that the negative electrode is in a lithium-rich state; the situation is opposite is true when discharging.

With the increasing requirements on the specific energy of a power battery, the traditional graphite negative electrode can no longer meet the requirements. In the development of 300 Wh/kg high specific energy battery, the high nickel ternary+silicon carbon negative electrode material will become the mainstream material system of a power battery. The theoretical specific capacity of a Si material is as high as 4200 mAh/g, but the volume expansion is as high as 300% during lithium intercalation, which will lead to cracks in a SEI film formed on the surface of Si particles or other Si-based negative electrodes, resulting in a continuous consumption of the electrolyte and active lithium in the positive electrode.

ZHEJIANG FUNLITHIUM NEW ENERGY TECH CO., LTD has developed a new lithium ion battery, which comprises a positive electrode plate, a negative electrode plate, separators arranged between the positive electrode plate and the negative electrode plate at intervals, and an electrolyte, and further comprises a third electrode and a fourth electrode, which are provided between the positive electrode plate and the negative electrode plate, wherein the third electrode and the fourth electrode are separated by means of a single-layer separator, a metal lithium negative electrode being used as the third electrode, and an activated carbon electrode being used as the fourth electrode. However, the existing ways usually do not include lithium supplementation. With regard to this kind of lithium ion battery with additional third and fourth electrodes, it is necessary to develop new matching charging and discharging methods.

SUMMARY OF THE INVENTION

The objective of the present invention is to provide charge and discharge methods of a lithium ion battery with a high capacity retention rate, which can be applied to a lithium ion battery with a third/fourth electrode and have the function of timely lithium supplementation.

The first objective of the present invention is achieved by the following technical solution:

charging and discharging methods of a lithium ion battery with a high capacity retention rate, which comprise the following steps:

(1) when a number of turns is n, negative and positive electrodes of the lithium ion battery are only charged; after the charging is finished, a third electrode and a fourth electrode are discharged with controlled current, wherein the controlled current is 0.05-10 A;

(2) after standing for 1 hour, the fourth electrode is connected in parallel with the negative electrode of the lithium ion battery to perform the discharge with the positive electrode of the lithium-ion battery;

(3) common charge and discharge between the positive and negative electrodes of the lithium ion battery occur at the (n+1)th and subsequent turns;

(4) the common charge and discharge are continued until the next conditional number of turns, and steps (1)-(4) are repeated; and (5) when the number of cycles reaches the specified number of turns, the charging and discharging methods are finished;

n is the conditional number of turns, which is selected from the next turn every time the discharge capacity is attenuated by 0.2-1%.

In the prior art, the charging and discharging methods do not include a lithium supplementation process or one-time lithium supplementation process, and the attenuation process of a battery is irreversible. According to the above technical solution, the lithium ion battery of the present application can supplement lithium in time, and when the attenuation condition is found, that is, when the discharge capacity is attenuated by 0.2-1%, the positive and negative electrodes can be charged in time; after the charging is finished, the third electrode and the fourth electrode are discharged to realize accurate and quantitative active lithium supplementation, and the third electrode-metal lithium electrode only has a discharge process without charging process, and no lithium dendrites will be generated. The uniform dispersion of active lithium in the battery can be further promoted after the standing process in step (2); the regeneration degree of supplemented lithium of the battery is controllable, and can be programmed for adjustment according to the actual capacity combined with BMS; the charging and discharging methods can release lithium according to the individual needs of each battery cell or battery pack, which is helpful to improve the capacity retention rate.

The present invention is further provided as follows: in the step (1), the third electrode is an auxiliary negative electrode, the fourth electrode is an auxiliary positive electrode, and the discharge current is preferably 0.05-2 A.

According to the above technical solution, the discharge capacity between the third electrode and the fourth electrode is calculated by multiplying the current by the time. If the current is small, the time required for lithium supplement is long; if the current is large, the fourth electrode may precipitate lithium, which may cause potential safety hazards.

The present invention is further provided as follows: the discharge cut-off condition in the steps (1) and (2) is preferably the discharge voltage or the discharge time.

According to the above technical solution, the discharge cut-off condition is selected as either discharge voltage or discharge time, which makes the cut-off mode more flexible and operable with the two options.

The present invention is further provided as follows: the discharge voltage is preferably 2.3-2.9 V.

According to the above technical solution, when the discharge voltage exceeds 2.9 V, the discharge capacity is low and the lithium supplement is insufficient; when the discharge voltage is lower than 2.3 V, the discharge capacity will be too high, and the lithium supplement will be too much, resulting in lithium precipitation in the negative electrode graphite.

The present invention is further provided as follows: the discharge time is preferably 1-30 min.

According to the above technical solution, when the discharge time exceeds 30 min, the lithium supplementation time is too long, which is not conducive to operation, and too much lithium supplementation causes lithium precipitation in the negative electrode graphite; when the discharge time is less than 1 min, the discharge time is too short, the discharge capacity is low, and the lithium supplement is insufficient.

The present invention is further provided as follows: the capacity retention rate of the lithium ion battery is at least 95%.

According to the above technical solution, the charge and discharge methods of the present application can significantly improve the capacity retention rate of the lithium ion battery. Compared with the batteries of the prior art, the discharge capacity attenuation of the lithium ion battery is reduced after multiple cycles, such that the lithium ion battery has a longer service life.

In summary, the beneficial technical effects of the present invention are as follows:

1. The lithium ion battery of the present application can supplement lithium in time, and when the attenuation condition is found, that is, when the discharge capacity is attenuated by 0.2-1%, the positive and negative electrodes can be charged in time; after the charging is finished, the third electrode and the fourth electrode are discharged to realize accurate active lithium supplementation as needed.

2. The discharge between the third electrode and the fourth electrode is realize by controlling the discharge time, the discharge cut-off voltage and current, and the cut-off voltage at which the fourth electrode is connected in parallel with the negative electrode of the lithium ion battery to perform the regular discharge with the positive electrode of the lithium ion battery, so as to realize accurate and quantitative supplement of active lithium.

3. The metal lithium electrode only has a discharge process, which has low requirements on the environment, and since there is no charging process, no lithium dendrites are generated, which solves the safety problem problems in the use of conventional lithium metal.

4. The uniform dispersion of active lithium in the battery can be further promoted after standing for an appropriate period of time.

DETAILED DESCRIPTION OF EMBODIMENTS

The present invention is further described in detail below in combination with examples.

A lithium ion battery with a third/fourth electrode, the preparation method therefor comprise the following steps:

(1) Providing a graphite negative electrode, a NCM111 positive electrode, and a separator of the lithium ion battery, and laminating them according to a conventional process.

(2) Providing a lithium foil with a thickness of 100 μm, which is roughened by using a stainless steel roller with a roughness of 100 meshes at a rolling pressure of 10 MPa as a third electrode; wet mixing 50% of activated carbon, 40% of hard carbon, 5% of PVDF, 4% of acetylene black, 1% of $Li_2SO_4$ and foam nickel, rolling and drying same to obtain a fourth electrode, laminating one layer of the third electrode and one layer of the fourth electrode on both sides of the above battery cell, respectively, with a separator therebetween for separation. The negative electrode tabs of the lithium ion battery are ultrasonically spot-welded together and led out from the outer tab, the positive electrode tabs of the lithium ion battery are ultrasonically spot-welded together and led out from the outer tab, two lithium metal electrodes on both sides are calendered and bonded and led out from the outer tab, and two fourth electrodes are ultrasonically spot-welded together and led out from the outer tab to form a lithium ion battery cell with four electrodes. After electrolyte injection, and pre-sealing, top sealing, side sealing and secondary sealing with aluminum plastic films, a lithium ion battery cell 10 Ah is formed.

Example I

Charge and discharge methods of the lithium ion battery with a high capacity retention rate, wherein a lithium ion battery having a third/fourth electrode is selected, and charge and discharge on the lithium ion battery comprise the following steps:

(1) After the conventional formation, 1C charge and discharge cycle test is started on the battery with a voltage from 4.2 V-3 V, when the discharge capacity has not attenuated to 99%, and when the amount of attenuation has not reached 1%, the charge and discharge of the negative and positive electrodes of the lithium ion battery are normally performed.

(2) The negative and positive electrodes of the lithium ion battery are only charged at the number of turns every time the discharge capacity is attenuated by 1%; after the charging is finished, the third electrode and the fourth electrode are discharged at 1 A to 2.8 V.

(3) Next, standing for 1 hour, the fourth electrode is connected in parallel with the negative electrode of the lithium ion battery to perform the discharge with the positive electrode of the lithium-ion battery, wherein the discharge cut-off voltage is 2.7 V.

(4) This is followed by in the turns where the capacity attenuation does not increase to 1%, the charge and discharge of the negative and positive electrodes of the lithium ion battery are normally performed.

(5) If the attenuation amount of the discharge capacity increases to another 1%, the operations of (1)-(5) are repeated until the end of discharge at the 2000th turn, and the discharge capacity retention rate is calculated.

Example II

Charge and discharge methods of the lithium ion battery with a high capacity retention rate, wherein a lithium ion battery having a third/fourth electrode is selected, and charge and discharge on the lithium ion battery comprise the following steps:

(1) After the conventional formation, 1C charge and discharge cycle test is started on the battery with a voltage from 4.2 V-3 V, when the discharge capacity has not attenuated to 99.5%, and when the amount of attenuation has not reached 0.5%, the charge and discharge of the negative and positive electrodes of the lithium ion battery are normally performed.

(2) The negative and positive electrodes of the lithium ion battery are only charged at the number of turns every time the discharge capacity is attenuated by 0.5%; after the charging is finished, the third electrode and the fourth electrode are discharged at 0.2 A for 10 min;

(3) Next, standing for 1 hour, the fourth electrode is connected in parallel with the negative electrode of the lithium ion battery to perform the discharge with the positive electrode of the lithium-ion battery, wherein the discharge cut-off voltage is 2.8 V.

(4) This is followed by in the turns where the capacity attenuation does not increase by 0.5%, the charge and discharge of the negative and positive electrodes of the lithium ion battery are normally performed.

(5) If the attenuation amount of the discharge capacity increases to another 0.5%, the operations of (1)-(5) are repeated until the end of discharge at the 2000th turn, and the discharge capacity retention rate is calculated.

Example III

Charge and discharge methods of the lithium ion battery with a high capacity retention rate, wherein a lithium ion battery having a third/fourth electrode is selected, and charge and discharge on the lithium ion battery comprise the following steps:

(1) After the conventional formation, 1C charge and discharge cycle test is started on the battery with a voltage from 4.2 V-3 V, when the discharge capacity has not attenuated to 99.8%, and when the amount of attenuation has not reached 0.2%, the charge and discharge of the negative and positive electrodes of the lithium ion battery are normally performed.

(2) The negative and positive electrodes of the lithium ion battery are only charged at the number of turns every time the discharge capacity is attenuated by 0.2%; after the charging is finished, the third electrode and the fourth electrode are discharged at 0.2 A for 1 min.

(3) Next, standing for 1 hour, the fourth electrode is connected in parallel with the negative electrode of the lithium ion battery to perform the discharge with the positive electrode of the lithium-ion battery, wherein the discharge cut-off voltage is 2.8 V.

(4) This is followed by in the turns where the capacity attenuation does not increase by 0.2%, the charge and discharge of the negative and positive electrodes of the lithium ion battery are normally performed.

(5) If the attenuation amount of the discharge capacity increases to another 0.2%, the operations of (1)-(5) are repeated until the end of discharge at the 2000th turn, and the discharge capacity retention rate is calculated.

Example IV

Charge and discharge methods of the lithium ion battery with a high capacity retention rate, wherein a lithium ion battery having a third/fourth electrode is selected, and charge and discharge on the lithium ion battery comprise the following steps:

(1) After the conventional formation, 1C charge and discharge cycle test is started on the battery with a voltage from 3.9 V-2.5 V, when the discharge capacity has not attenuated to 99%, and when the amount of attenuation has not reached 1%, the charge and discharge of the negative and positive electrodes of the lithium ion battery are normally performed.

(2) The negative and positive electrodes of the lithium ion battery are only charged at the number of turns every time the discharge capacity is attenuated by 1%; after the charging is finished, the third electrode and the fourth electrode are discharged at 0.5 A to 2.4 V;

(3) Next, standing for 1 hour, the fourth electrode is connected in parallel with the negative electrode of the lithium ion battery to perform the discharge with the positive electrode of the lithium-ion battery, wherein the discharge cut-off voltage is 2.3 V.

(4) This is followed by in the turns where the capacity attenuation does not increase by 1%, the charge and discharge of the negative and positive electrodes of the lithium ion battery are normally performed.

(5) If the attenuation amount of the discharge capacity increases to another 1%, the operations of (1)-(5) are repeated until the end of discharge at the 3500th turn, and the discharge capacity retention rate is calculated.

Example V

Charge and discharge methods of the lithium ion battery with a high capacity retention rate, wherein a lithium ion battery having a third/fourth electrode is selected, and charge and discharge on the lithium ion battery comprise the following steps:

(1) After the conventional formation, 1C charge and discharge cycle test is started on the battery with a voltage from 4.2 V-3.0 V, when the discharge capacity has not attenuated to 99.7%, and when the amount of attenuation has not reached 0.3%, the charge and discharge of the negative and positive electrodes of the lithium ion battery are normally performed.

(2) The negative and positive electrodes of the lithium ion battery are only charged at the number of turns every time the discharge capacity is attenuated by 0.3%; after the charging is finished, the third electrode and the fourth electrode are discharged at 0.05 A for 30 min;

(3) Next, standing for 1 hour, the fourth electrode is connected in parallel with the negative electrode of the lithium ion battery to perform the discharge with the positive electrode of the lithium-ion battery, wherein the discharge cut-off voltage is 2.8 V.

(4) This is followed by in the turns where the capacity attenuation does not increase by 0.3%, the charge and discharge of the negative and positive electrodes of the lithium ion battery are normally performed.

(5) If the attenuation amount of the discharge capacity increases to another 0.3%, the operations of (1)-(5) are repeated until the end of discharge at the 3000th turn, and the discharge capacity retention rate is calculated.

Comparative Example I

A lithium ion battery, the preparation method and charging and discharging methods therefor are as follows:

(1) Providing a graphite negative electrode, a NCM111 positive electrode, and a separator of the lithium ion battery, and laminating them according to a conventional process.

(2) After electrolyte injection, and pre-sealing, top sealing, side sealing and secondary sealing with aluminum plastic films, a lithium ion battery cell 10 Ah is formed.

(3) After the conventional formation, 1C charge and discharge cycle test is started on the battery with a voltage from 4.2 V-3 V. After 2000 cycles, the capacity retention rate of the lithium ion battery is calculated.

Comparative Example II

A lithium ion battery, the preparation method and charging and discharging methods therefor are as follows:

(1) Providing a graphite negative electrode, a NCA positive electrode, and a separator of the lithium ion battery, and laminating them according to a conventional process.

(2) After electrolyte injection, and pre-sealing, top sealing, side sealing and secondary sealing with aluminum plastic films, a lithium ion battery cell 10 Ah is formed.

(3) After the conventional formation, 1C charge and discharge cycle test is started on the battery with a voltage from 4.2 V-3 V. After 2000 cycles, the capacity retention rate of the lithium ion battery is calculated.

Comparative Example III

A lithium ion battery, the preparation method and charging and discharging methods therefor are as follows:

(1) Providing a silicon carbon negative electrode, a NCM523 positive electrode, and a separator of the lithium ion battery, and laminating them according to a conventional process.

(2) After electrolyte injection, and pre-sealing, top sealing, side sealing and secondary sealing with aluminum plastic films, a lithium ion battery cell 40 Ah is formed.

(3) After the conventional formation, 1C charge and discharge cycle test is started on the battery with a voltage from 4.2 V-3 V. After 2000 cycles, the capacity retention rate of the lithium ion battery is calculated.

Comparative Example IV

A lithium ion battery, the preparation method and charging and discharging methods therefor are as follows:

(1) Providing a graphite negative electrode, a $LiFePO_4$ positive electrode, and a separator of the lithium ion battery, and winding them according to a conventional process.

(2) Placing the lithium ion battery into an aluminum shell, injecting an electrolyte, and sealing same to form a lithium ion battery cell 20 Ah.

(3) After the conventional formation, 1C charge and discharge cycle test is started on the battery with a voltage from 3.9 V-2.5 V. After 3500 cycles, the capacity retention rate of the lithium ion battery is calculated.

Comparative Example V

A lithium ion battery, the preparation method and charging and discharging methods therefor are as follows:

(1) Providing a silicon carbon negative electrode, a $LiMnO_2$ positive electrode, and a separator of the lithium ion battery, and winding them according to a conventional process.

(2) Placing the lithium ion battery into an aluminum shell, injecting an electrolyte, and sealing same to form a lithium ion battery cell 30 Ah.

(3) After the conventional formation, 1C charge and discharge cycle test is started on the battery with a voltage from 4.2 V-3 V. After 3000 cycles, the capacity retention rate of the lithium ion battery is calculated.

Test method: the discharge capacity at the 3000th turn is divided by the discharge capacity of the first turn, and the instrument adopts the MEWARE charging and discharging cabinet.

Test Results

| Sample | Capacity retention rate (%) |
|---|---|
| Example I | 97 |
| Example II | 96 |
| Example III | 95 |
| Example IV | 98 |
| Example V | 96 |
| Comparative example I | 80 |
| Comparative example II | 75 |
| Comparative example III | 65 |
| Comparative example IV | 85 |
| Comparative example V | 70 |

It can be seen from the above table that the capacity retention rates of the lithium ion batteries of the present application after a long cycle are all more than 95%, which is greater than that of the samples of the comparative examples. It can be seen that timely lithium supplementation during the use of the lithium ion battery can improve the capacity retention rate of the lithium ion battery.

The examples in the specific implementations are preferred examples of the present invention, and are not intended to limit the scope of protection of the present invention, and thus: equivalent changes made according to the structure, shape and principle of the present invention shall be contained within the scope of protection of the present invention.

The invention claimed is:

1. A charging and discharging method of a lithium ion battery with a high capacity retention rate, characterized in that the method comprise the following steps:
  (1) when a number of turns is n, negative and positive electrodes of the lithium ion battery are only charged; after a charging is finished, a third electrode and a fourth electrode are discharged with controlled current, wherein the controlled current is 0.05-10 A;
  (2) after standing for 1 hour, the fourth electrode is connected in parallel with the negative electrode of the lithium ion battery to perform a discharge with the positive electrode of the lithium-ion battery;
  (3) common charge and discharge between the positive and negative electrodes of the lithium ion battery occur at the (n+1)th and subsequent turns;
  (4) the common charge and discharge are continued until a next conditional number of turns, and steps (1)-(4) are repeated; and
  (5) when a number of cycles reaches a specified number of turns, the charging and discharging method is finished;
  wherein n is a conditional number of turns, which is selected from a next turn every time the discharge capacity is attenuated by 0.2-1%.

2. The charging and discharging method of the lithium ion battery with a high capacity retention rate according to claim 1, wherein in the step (1), the third electrode is an auxiliary negative electrode, the fourth electrode is an auxiliary positive electrode, and a discharge current is 0.05-2 A.

3. The charging and discharging method of the lithium ion battery with a high capacity retention rate according to claim 1, wherein a discharge cut-off condition in the steps (1) and (2) is a discharge voltage or discharge time.

4. The charging and discharging method of the lithium ion battery with a high capacity retention rate according to claim 3, wherein the discharge voltage is 2.3-2.9 V.

5. The charging and discharging method of the lithium ion battery with a high capacity retention rate according to claim 3, wherein the discharge time is 1-30 min.

6. The charging and discharging method of the lithium ion battery with a high capacity retention rate according to claim 1, wherein a capacity retention rate of the lithium ion battery is at least 95%.

\* \* \* \* \*